J. P. GLANNON.
FLUSHING TANK.
APPLICATION FILED SEPT. 28, 1908.

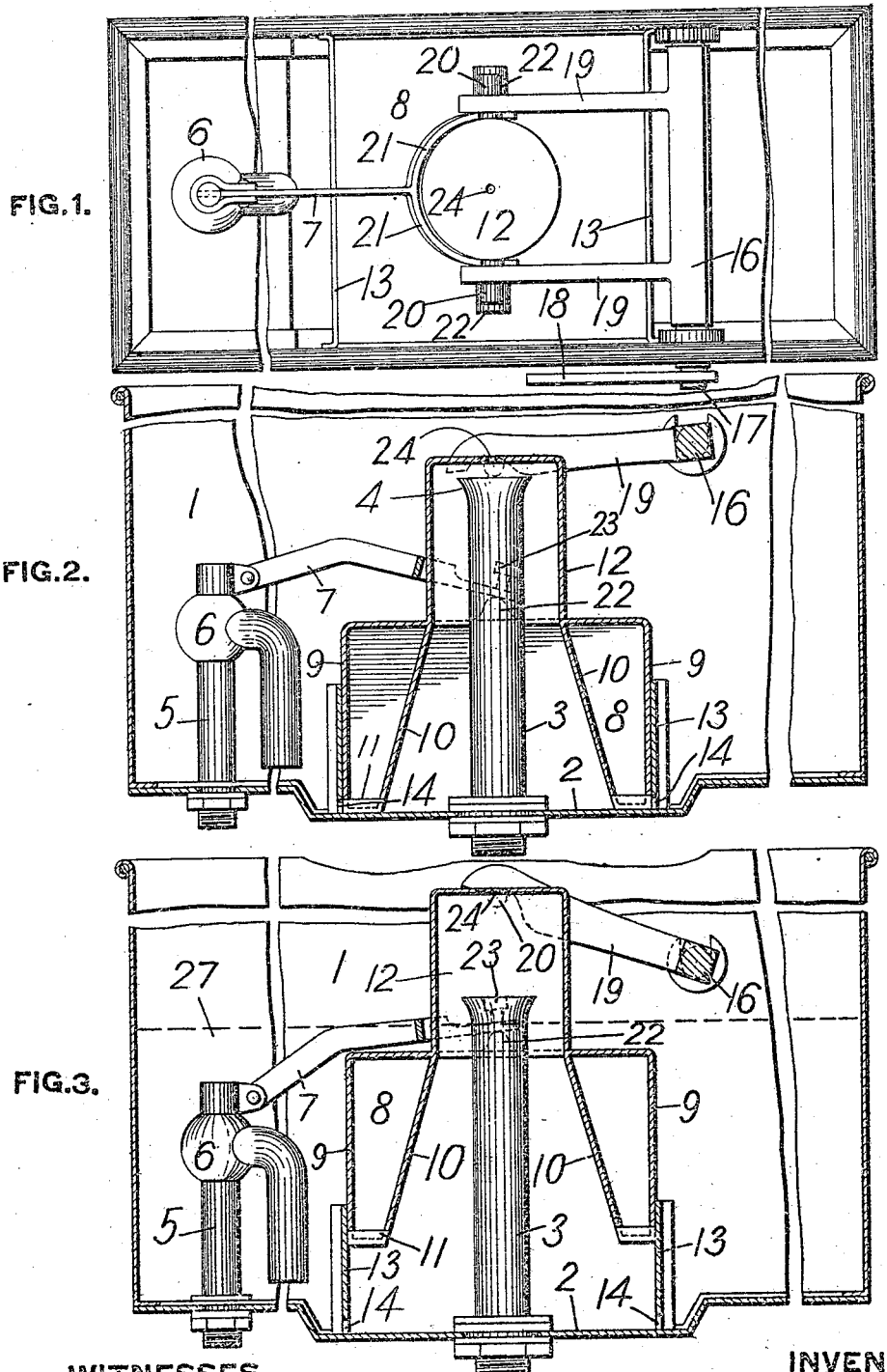

949,927.

Patented Feb. 22, 1910.
2 SHEETS—SHEET 2.

WITNESSES
Marie K. Draper.
Chas. Lockerman

INVENTOR
John P. Glannon,
By Fredk. W. Winter
His Attorney.

UNITED STATES PATENT OFFICE.

JOHN P. GLANNON, OF PITTSBURG, PENNSYLVANIA, ASSIGNOR OF ONE-HALF TO JOHN A. SEILER, OF PITTSBURG, PENNSYLVANIA.

FLUSHING-TANK.

949,927.      Specification of Letters Patent.      Patented Feb. 22, 1910.

Application filed September 28, 1908. Serial No. 455,183.

*To all whom it may concern:*

Be it known that I, JOHN P. GLANNON, a resident of Pittsburg, in the county of Allegheny and State of Pennsylvania, have invented a new and useful Improvement in Flushing-Tanks, of which the following is a specification.

This invention relates to flushing tanks designed for flushing closets, hoppers and bowls.

The object of the invention is to provide a simple and inexpensive valve for controlling the outlet of the tank and which can be used either independently of the inlet valve or serve as a float to actuate the inlet valve and by means of which the siphonic action is regulated so as to fill the bowl or hopper after flushing.

The invention comprises the construction and arrangement of parts hereinafter described and claimed.

Figure 4:
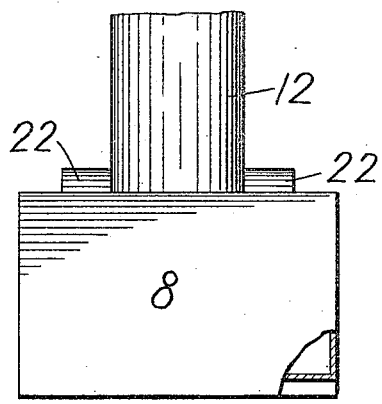
Figure 6:
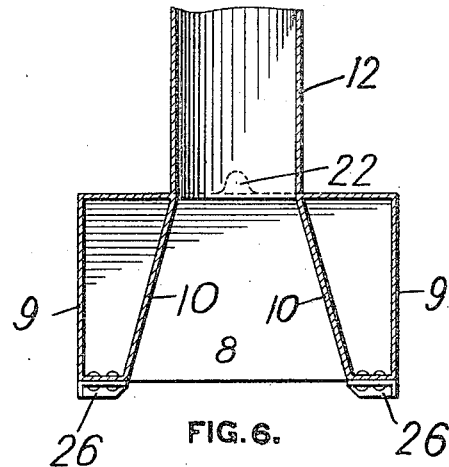
Figure 5:
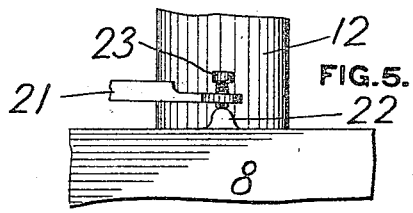
Figure 7:
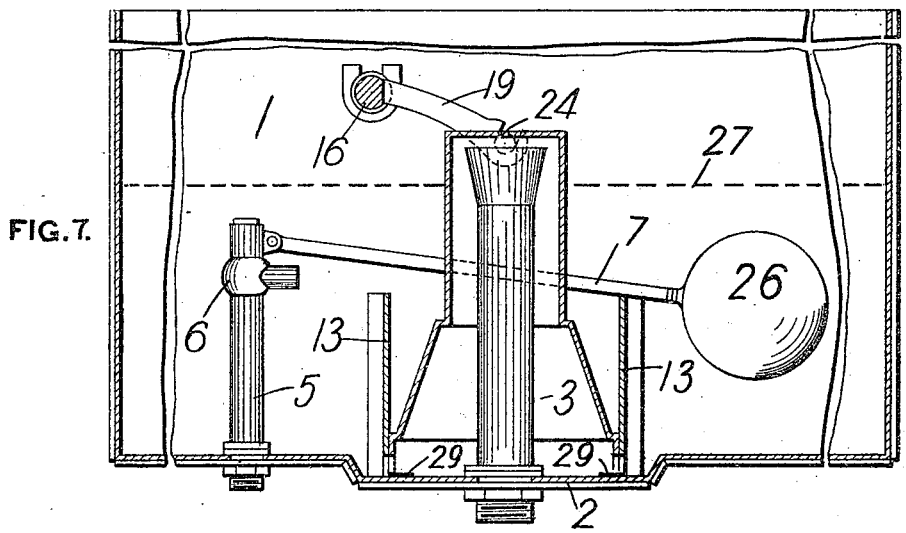

In the accompanying drawings Figure 1 is a plan view of my improved tank; Fig. 2 is a longitudinal sectional view thereof showing the parts in the position they assume when the tank is empty; Fig. 3 is a similar view showing the parts in the position they assume when the tank is full; Fig. 4 is an elevation, partly in section, of the combined float and valve employed; Fig. 5 is a detail view showing the means for adjusting the float lever; Fig. 6 is a vertical sectional view of a float valve of slightly modified form, and Fig. 7 is a longitudinal sectional view showing a modified form of valve.

In the drawings 1 designates the tank, which may be of any suitable shape and constructed of any suitable material, being shown as rectangular in form and constructed of metal. The bottom of the tank may be provided centrally with a depressed portion 2. Secured in an opening centrally of said depressed portion is the vertical outlet pipe 3 which extends upwardly toward the top of the tank to such height that its upper end is above the normal level of water contained in the tank. Preferably the top of this pipe is flared, as shown at 4. At 5 is shown the inlet pipe provided with an inlet valve 6 which is controlled by a float lever 7. The inlet pipe and valve may be of any suitable form.

The outlet valve is in the form of a hood, or inverted cup, located over and around the inlet pipe. As shown in Figs. 1–5 the valve comprises a box-like structure 8 of square or rectangular form in plan view provided with exterior vertical walls 9 and inclined or downwardly flaring interior walls 10. The lower edges of said walls are recessed or cut away at 11 on two opposite sides of the box-like structure. This box-like structure supports the hood proper 12, located over the upper end of the outlet pipe and being practically a continuation of the interior walls 10 of the box-like structure, the space in said hood communicating with the space in said box-like structure. In the preferred form the valve is so constructed as to be buoyant so that functionally it serves both as an outlet valve and as a float for actuating the inlet valve. The buoyancy may be secured in any suitable way, but preferably by inclosing the space between the exterior walls 9 and interior walls 10 to form a hollow body which acts as a float to take the place of the ball float ordinarily employed.

The flushing valve described is guided vertically by walls or partitions 13 shown as extending transversely of the tank and contacting with the vertical walls 9 of the float valve. The walls or partitions 13 are provided at their lower edges with restricted openings 14 forming communication between the space inside the float valve and the main body of the tank. The space inside of the float valve, that is, within the hood 12 and between the walls 10, is entirely free from obstruction, and said interior space in horizontal section is of larger area than the openings 14 in the partitions 13.

To flush the tank the valve is depressed. A convenient means for this comprises a shaft 16 journaled in the side walls of the tank and provided with a square end 17 for receiving an arm 18 or other operating means. The shaft 16 is provided with arms 19 whose outer ends are connected to, or contact with, oppositely disposed trunnions 20 carried by the hood 12. The float valve may be operatively connected to the float lever 7 by various means, the drawings showing the lever 7 forked and with the arms 21 thereof arranged to contact with lugs or bosses 22 provided on the box-like structure 8. In order to adjust the opening and closing positions of the inlet valve set screws 23 are threaded through the arms of the valve lever and contact with the lugs or bosses 22.

In order to quickly cut off the siphonic flow and regulate said flow to fill the bowl or hopper after flushing, it is necessary to admit air into the interior of the valve before the water level is so low as to admit air through the cut away parts 11. I therefore provide an air opening into the valve at some point above the cut away part 11, preferably through the top of the valve, as at 24. This opening is quite small and the size is preferably varied with variations of water pressure, or rate of flow through the inlet valve. When the tank is full the float valve is in the position shown in Fig. 3, that is, in elevated position, thus holding the inlet valve 6 closed. In this position the water level is somewhat below the top of the inlet pipe, being indicated at 27. In order to flush the tank, shaft 16 is rocked to force the float valve downwardly between the partitions 13. Since the openings 14 in said partitions are of comparatively restricted area the water within the float valve which is displaced by the downward movement of the valve cannot escape through said openings sufficiently rapidly and therefore the water level within the float valve is temporarily raised above the top of the outlet pipe. The latter is sealed by the water entering the same, and as said water flows downwardly through said pipe it sets up siphonic action which draws the water out of the tank, the water of the main body of the tank flowing through the openings 14 in the partitions 13 and thence upwardly in the float valve and down through the pipe 3. The siphonic action continues until the level of water drops below the upper edges of openings 11 and 14 after which air is permitted to enter and breaks the siphonic action. A certain amount of air enters through the small aperture 24 so that the siphonic action is reduced toward the end of the flow, and the reduced discharge into the bowl suffices to fill the bowl at the end of flushing. As soon as the water level in the tank falls below the top of the openings 11 and 14 the siphonic action is immediately and quickly interrupted so that the grumbling and other disagreeable noises present in some forms of flushing tanks is entirely absent. The tank will be drained practically of its contents with the exception of the water contained in the depressed portion 2.

In Fig. 6 is shown a modification wherein the float valve instead of being provided with the cut away portions 11 is provided with feet or lugs 26 which serve to hold the body of said valve above the bottom of the tank and gives the same effect as though the valve were provided with cut away portions.

Fig. 7 shows a modification in which the exterior walls 9 of the float valve are omitted. In this modification the valve is not buoyant and an independent ball float 26 is provided on the lever 7 of the inlet valve. In this modification the hood valve normally remains in its lowermost position and in order to actuate the same it is necessary to first lift the same and then permit it to drop, thereby causing the water within the same to overflow the outlet pipe and set up siphonic action. In order to deaden the noise when this valve strikes the bottom of the tank it is provided with cushions 29.

The hood valves described are shown as formed of sheet metal, and while this is preferred, it is to be understood that the invention is not limited thereto, as said valves may be formed of any suitable durable material. For convenience and cheapness of construction the square or rectangular form of valve shown is preferred, as it can be constructed with a minimum waste of material and also enables the use of simple straight partitions extending across the tank from side to side. Certain features of the invention however, are not limited in this particular but are equally as well adapted to float valves of circular or other form and with confining and guiding walls of similar form.

What I claim is:

1. Flushing apparatus comprising a tank, a vertical outlet pipe extending from an opening in said tank, transverse partitions in said tank providing restricted openings of constant size at their lower edges, a depressible inverted cup or hood valve located over said outlet pipe and flaring toward its lower end and guided by said partitions, and means for actuating said valve, said valve being provided in its upper end with a constantly open air opening.

2. Flushing apparatus comprising a tank, an outlet pipe extending upwardly from an opening in said tank, a depressible hollow buoyant structure provided with a hood or inverted cup located above the outlet pipe, an inlet valve lever connected to said buoyant structure, walls or partitions guiding said buoyant structure and provided with restricted openings of constant size at their lower edges, said buoyant structure being provided with means for regulating the flow of water, and operating means arranged to depress said buoyant structure.

3. Flushing apparatus comprising a tank, an outlet pipe extending upwardly from an opening in said tank, a depressible inverted cup or hood valve located above said outlet pipe and flaring toward its lower end, partitions or walls bearing against and guiding said inverted cup or hood and provided with restricted openings of constant size at their bottom edges, and means for actuating said cup or hood valve, said valve being provided with a constantly open small air inlet through the upper portion thereof.

4. Flushing apparatus comprising a tank, a vertical outlet pipe extending upwardly from an opening in said tank, a depressible inverted cup or hood valve located over said outlet pipe, partitions or walls arranged to guide said valve and provided with restricted openings of constant size at their lower edges, said valve being of buoyant construction and provided with a constantly open air hole in its upper portion, an inlet valve lever connected to said buoyant valve, and means arranged to depress said valve.

5. Flushing apparatus comprising a tank, an outlet pipe extending upwardly from an opening in the tank, an outlet valve comprising a depressible hollow buoyant body carrying a hood or inverted cup located over said outlet pipe, said hood being provided with a constantly open air hole, partitions or walls guiding said buoyant structure and providing restricted openings of constant size at their lower edges, an inlet valve lever connected to said buoyant body, and means arranged to depress said valve.

6. Flushing apparatus comprising a tank, a vertical outlet pipe extending from an opening in said tank, partitions or walls in the tank and providing restricted openings of constant size at their lower edges, a depressible inverted cup or hood valve located over the outlet pipe and provided with vertical portions guided by said transverse partitions or walls and flaring toward its lower end, said valve being provided with cut away portions at the lower end registering with the openings in the partitions and having a constantly open air inlet above said cut away portions, and means for actuating said valve.

In testimony whereof, I have hereunto set my hand.

JOHN P. GLANNON.

Witnesses:
WILLIAM I. KING,
F. W. WINTER.